(12) United States Patent
Otxoa-Aizpurua Calvo

(10) Patent No.: US 11,851,227 B2
(45) Date of Patent: Dec. 26, 2023

(54) SEALING APPARATUS FOR A PACKAGING MACHINE

(71) Applicant: ULMA Packaging, S. Coop., Oñati (ES)

(72) Inventor: Alberto Otxoa-Aizpurua Calvo, Oñati (ES)

(73) Assignee: ULMA PACKAGING, S. COOP., Oñati (ES)

( * ) Notice: Subject to any disclaimer, the term of this patent is extended or adjusted under 35 U.S.C. 154(b) by 324 days.

(21) Appl. No.: 17/394,076

(22) Filed: Aug. 4, 2021

(65) Prior Publication Data

US 2021/0362897 A1 Nov. 25, 2021

Related U.S. Application Data

(63) Continuation of application No. PCT/ES2020/070164, filed on Mar. 9, 2020.

(30) Foreign Application Priority Data

Mar. 15, 2019 (EP) ..................................... 19382187

(51) Int. Cl.
*B65B 51/30* (2006.01)
*B29C 65/18* (2006.01)
(Continued)

(52) U.S. Cl.
CPC .............. *B65B 51/30* (2013.01); *B29C 65/18* (2013.01); *B29C 65/743* (2013.01);
(Continued)

(58) Field of Classification Search
CPC ........... B29C 66/1122; B29C 66/81423; B29C 66/4312; B29C 66/849; B29C 66/81425;
(Continued)

(56) References Cited

U.S. PATENT DOCUMENTS

| 4,466,228 A * | 8/1984 | Gess ......................... B65B 9/02 53/553 |
| 6,176,953 B1 * | 1/2001 | Landreth ........... B29C 66/73921 156/73.3 |
| 2018/0272620 A1 * | 9/2018 | Persson ............... B29C 66/8491 |

FOREIGN PATENT DOCUMENTS

| JP | 2003-211563 A | 7/2003 |
| WO | 2017093486 A1 | 6/2017 |

OTHER PUBLICATIONS

European Search Report in corresponding European Patent Application No. EP19382187.3, dated Oct. 24, 2019.
(Continued)

*Primary Examiner* — Thomas M Wittenschlaeger
(74) *Attorney, Agent, or Firm* — Edell, Shapiro & Finnan, LLC

(57) ABSTRACT

A sealing apparatus including a sealing tool that is movable between an inactive position and a sealing position. The sealing tool includes two actuating elements, each with a respective actuating surface that face each other. The actuating elements are configured to allow the passage of a packaging material therebetween and for transversely sealing the packaging material when the sealing tool is in the sealing position. The actuating surfaces are configured to cooperate with one another to perform the sealing. The actuating surfaces are also configured to cooperate with one another during the change in position of the sealing tool to the sealing position, and for transversely cutting the packaging material during the change in position.

20 Claims, 10 Drawing Sheets

(51) Int. Cl.
  *B29C 65/74* (2006.01)
  *B29C 65/00* (2006.01)
  *B65B 61/06* (2006.01)
  *B29L 31/00* (2006.01)
(52) U.S. Cl.
  CPC .... *B29C 66/4312* (2013.01); *B29C 66/83221* (2013.01); *B29C 66/849* (2013.01); *B65B 61/06* (2013.01); *B29L 2031/712* (2013.01)
(58) Field of Classification Search
  CPC ........ B29C 66/83221; B29C 66/81422; B29C 66/4322; B29C 66/49; B29C 65/18; B29C 65/305; B29C 65/7894; B29C 65/7891; B29C 65/7841; B29C 65/743; B65B 51/30; B65B 61/06; B29L 2031/712
  See application file for complete search history.

(56) References Cited

OTHER PUBLICATIONS

International Search Report and Written Opinion in corresponding Int'l Patent Application No. PCT/ES2020/070164, dated Jun. 23, 2020.

\* cited by examiner

SEALING APPARATUS FOR A PACKAGING MACHINE

CROSS-REFERENCE TO RELATED APPLICATIONS

This application relates to and claims the benefit and priority to International Application No. PCT/ES2020/070164, filed Mar. 9, 2020, which claims the benefit and priority to European Application No. EP19382187.3, filed Mar. 15, 2019.

TECHNICAL FIELD

The present invention relates to sealing apparatus for packaging machines.

BACKGROUND

In a packaging machine, the product to be packaged is usually wrapped in a bag generated from a film tube. The film tube is generally generated from a film which is given a tubular shape. The film tube is closed at one end and the product to be packaged is introduced therein. With the product arranged in this manner, a cut is made on the tube to physically separate the part of the film tube containing the product (final bag or container) from the rest of the film tube, and a seal is made on each side of the cut for closing the bag at the other end and moreover for obtaining a film tube that is closed at one end. This process is repeated for each container to be obtained.

The packaging machine usually comprises a sealing apparatus for performing the described cutting and sealing operations. EP3115302A1 discloses a sealing apparatus for a packaging machine with this function. The sealing apparatus comprises a cutting tool (a blade in this case) for making the corresponding cut and a sealing tool for making the corresponding seals (one on each side of the cut). The cutting tool is moved with respect to the sealing tool by means of an associated actuator to make the corresponding cut.

WO2017093486A1 discloses a sealing apparatus for a packaging machine, comprising a sealing tool with two actuating elements with actuating surfaces facing each other such that, in an inactive position, they allow the passage of a packaging material therebetween in a forward movement direction. The actuating surfaces are configured for cooperating with one another in an active position, and for, with said cooperation, transversely cutting said packaging material and transversely sealing at least a first portion of the packaging material to a second portion of said packaging material, the transverse cut being between said seals. A first actuating element comprises a cutting edge which presses the sealing material against a wall of a second actuating element, thereby making the cut, and the cutting edge is defined between two sealing surfaces. Therefore, since it is the configuration of the actuating elements themselves that allows sealing and cutting the film, the need to have a cutting element and a sealing element capable of moving independently is avoided.

SUMMARY

Disclosed is a sealing apparatus for a packaging machine. The sealing apparatus comprises a sealing tool that is movable between an inactive position and a sealing position. The sealing tool comprises two actuating elements, each with a respective actuating surface, both actuating surfaces facing each other, and said tool is configured for changing position with the movement of at least one of the actuating elements with respect to the other actuating element.

The actuating elements are configured for allowing the passage of a packaging material therebetween in a forward movement direction when the sealing tool is in the inactive position, and for transversely sealing at least a first portion of the packaging material to a second portion of said packaging material when the sealing tool is in the sealing position, the actuating surfaces of both actuating elements being configured for cooperating with one another to perform transverse sealing.

The sealing tool is furthermore configured so that the actuating surfaces of both actuating elements retain between them the corresponding portion of the packaging material with said cooperation to perform transverse sealing, and so that said actuating surfaces furthermore also cooperate with one another during the change in position of said sealing tool to the sealing position, and transversely cut said packaging material during said change, with said additional cooperation.

Each actuating surface comprises a first sealing surface and a second sealing surface that are distributed in the forward movement direction, the corresponding sealing surfaces of each actuating surface being arranged one on top of the other in a staggered manner such that the first sealing surfaces of both actuating surfaces are complementary to one another and the second sealing surfaces of both actuating surfaces are complementary to one another.

Furthermore, each actuating surface comprises an edge defined between its two sealing surfaces, with one of the edges being arranged downstream in the forward movement direction with respect to the other edge and with said edges being configured for cooperating with one another during the change in position of the sealing tool to the sealing position, and for transversely cutting the packaging material with said cooperation during said change. The cut generated by said edges is therefore not caused by both edges impacting one another, and said cut does not cause the wear of said edges. Therefore, the service life of the actuating elements is not affected despite the inclusion of the cutting function, or at least increased with respect to the prior art in which the wear of the elements involved in generating the cut is more pronounced.

Therefore, the actuating surfaces of both actuating elements are configured for cooperating with one another, not only when the sealing tool is in the sealing position, but also during the change in position of the sealing tool, transversely cutting said packaging material during said change, with said cooperation and as a result of the edges.

An apparatus is thereby obtained in which the sealing and transverse cutting of a packaging material is achieved by means of the actual configuration of a sealing tool, which furthermore also acts as a cutting tool, which allows using the required sealing technology and is not being limited to the ultrasound technology like in the prior art, for example. Heat sealing technology, for example, which allows obtaining a simpler, more cost-effective apparatus that is easier to control and maintain can therefore be used, if required.

Furthermore, as the actual change in position of the sealing tool is used to make the corresponding cut, the cutting and sealing operations can be performed more quickly than in the prior art due to the actual configuration of the actuating elements of said sealing tool, where the speed of the corresponding packaging process can be increased while at the same time avoiding the use of actuators to perform additional movements to make the cut (movement of blades, for example).

These and other advantages and features will become evident in view of the drawings and detailed description.

DETAILED DESCRIPTION

Figure 1:
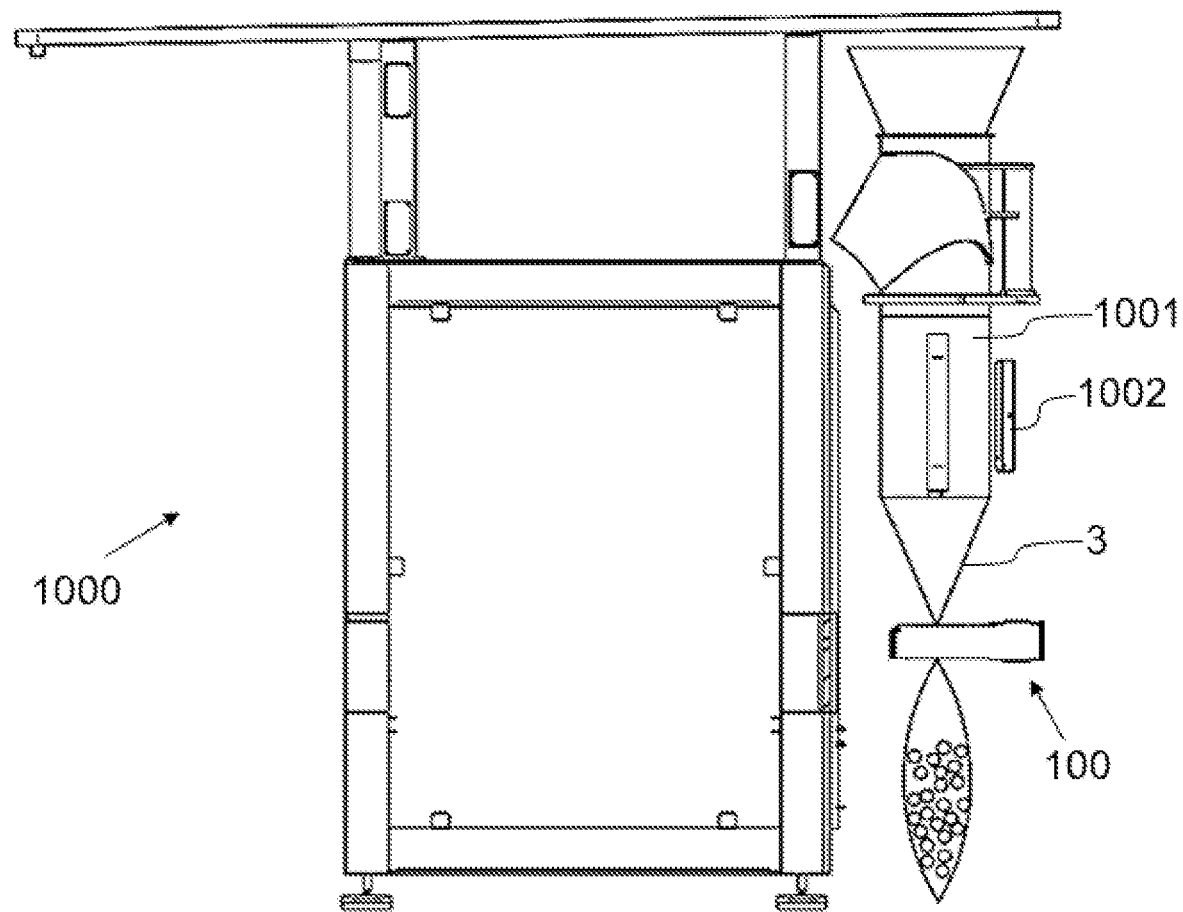
FIG. 1 shows a sealing apparatus for a packaging machine according to one embodiment.

The sealing apparatus 100 of the invention is suitable for a packaging machine 1000 like the one shown by way of example in FIG. 1. A film tube is generated in the machine 1000 from a continuous film by giving a tubular shape to said film using a forming tool 1001 configured for such purpose, for example, and longitudinally sealing the two longitudinal ends of said tubular-shaped film. The longitudinal sealing is performed by retaining said ends against one another or against the forming tool 1001 by means of a longitudinal sealing device 1002. As the film is fed, the film tube is caused to move forward in a forward movement direction A, and said forward movement can be continuous or intermittent.

Figure 2A:
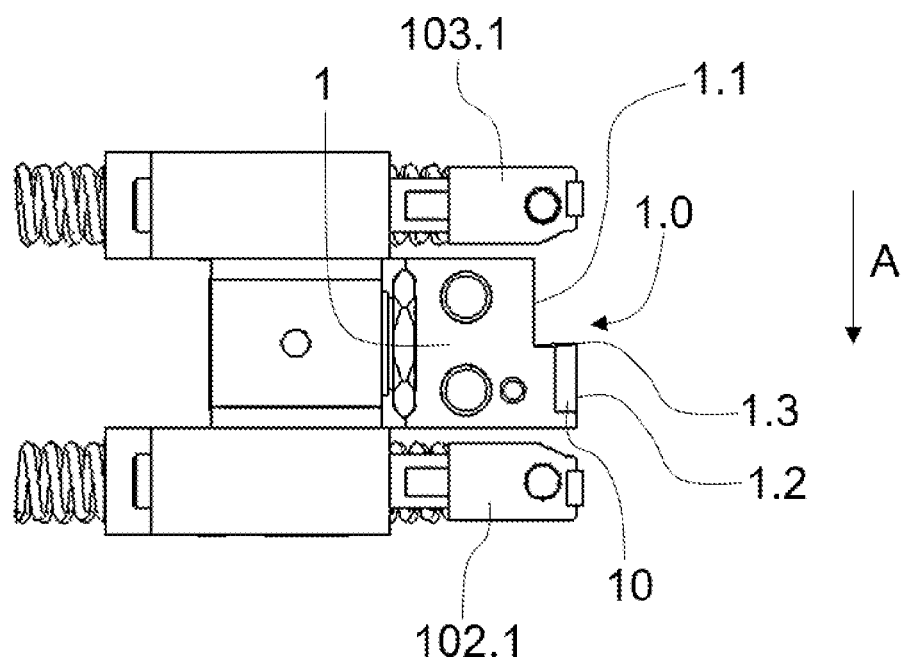
FIG. 2A laterally shows the first actuating element of the sealing apparatus of FIG. 1.
Figure 2B:
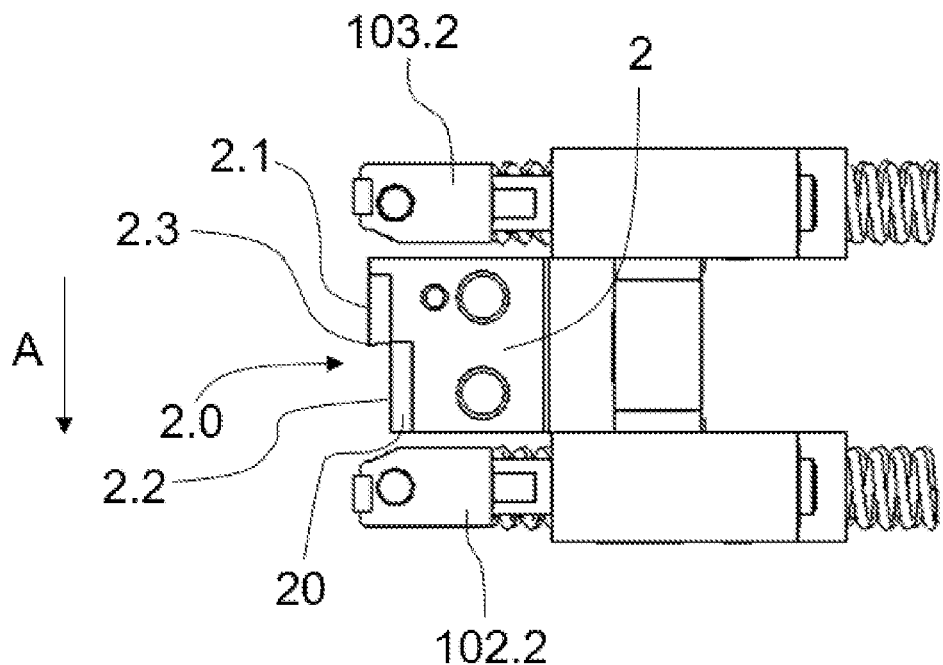
FIG. 2B laterally shows the second actuating element of the sealing apparatus of FIG. 1.

The sealing apparatus 100 comprises a sealing tool 101, and the sealing tool 101 comprises two actuating elements 1 and 2 depicted by way of example in FIGS. 2A and 2B, respectively. Each of said actuating elements 1 and 2 comprises a respective actuating surface 1.0 and 2.0, and both actuating surfaces are facing each other.

Figure 3A:
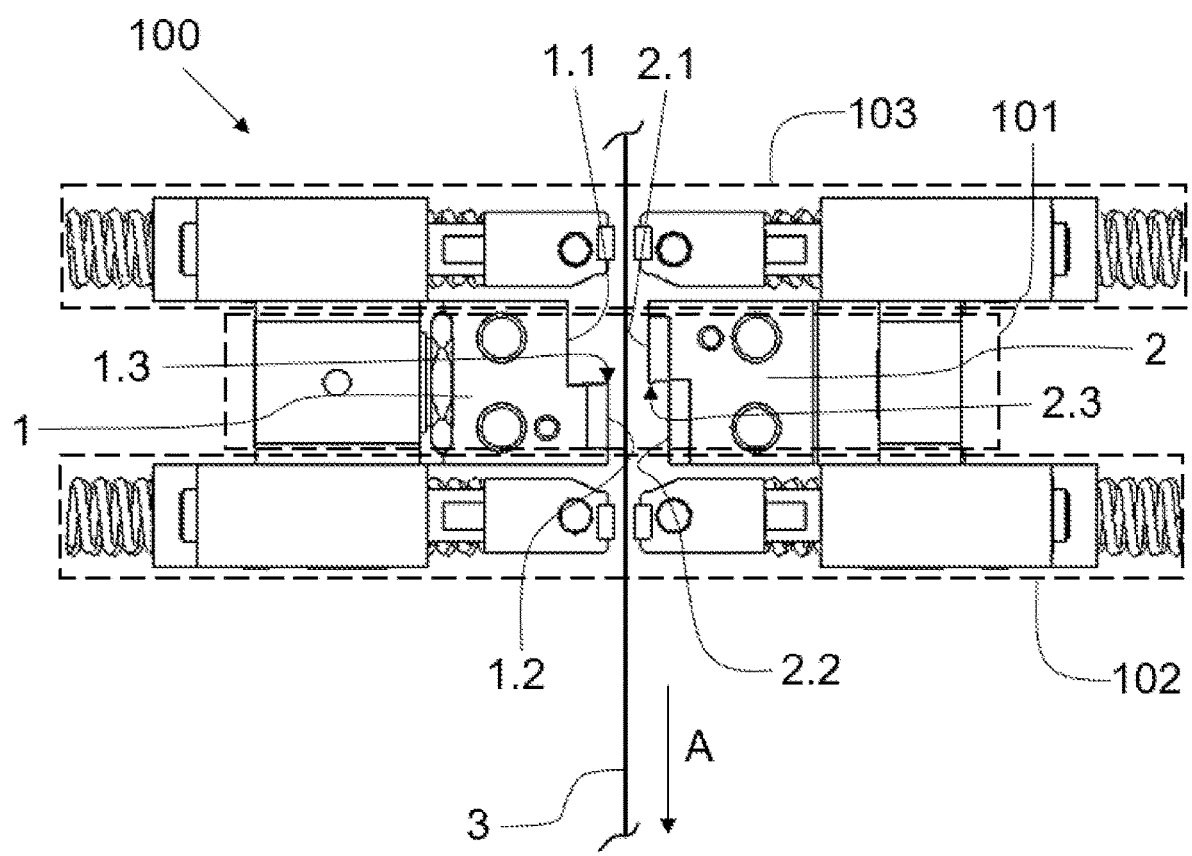
FIG. 3A is a side view of the sealing apparatus of FIG. 1, in the inactive position, with the packaging material between the actuating elements of said sealing apparatus.
Figure 3B:
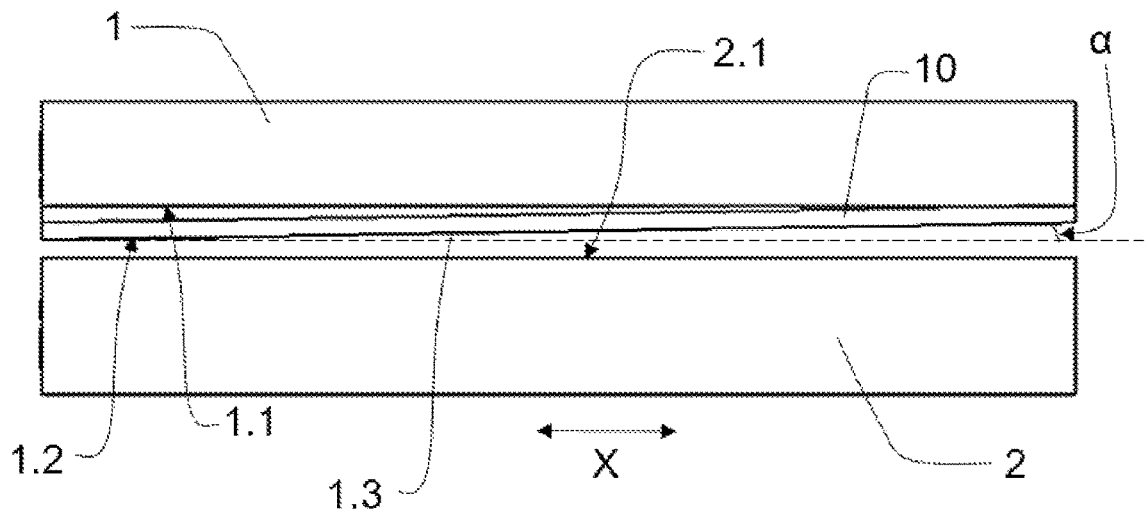
FIG. 3B is a plan view of the actuating elements of the sealing apparatus of FIG. 3A.
Figure 3C:
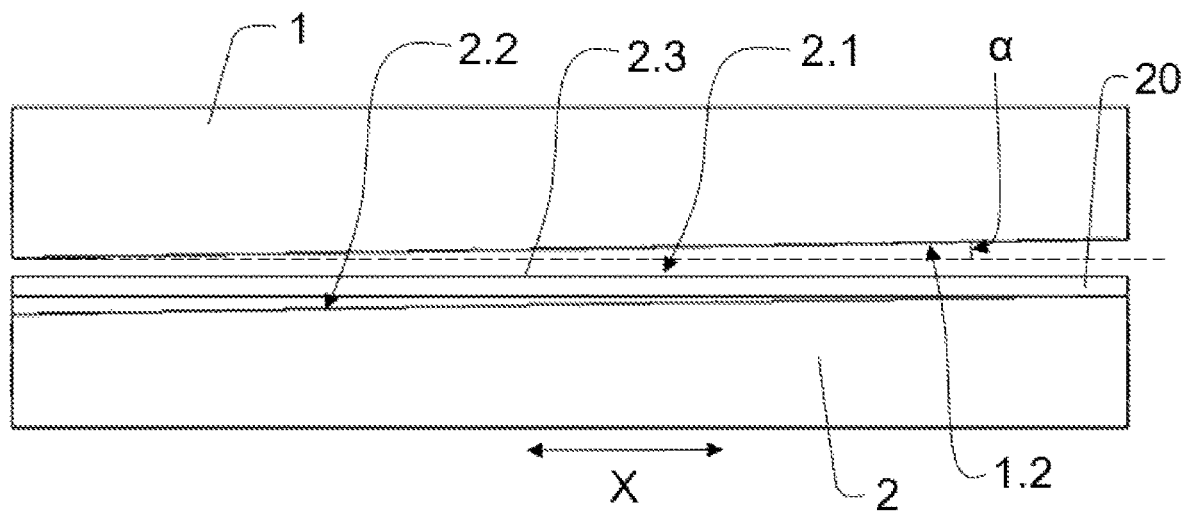
FIG. 3C is a bottom view of the actuating elements of the sealing apparatus of FIG. 3A.

The tool 101 is movable between an inactive position (FIGS. 3A, 3B, and 3C) and a sealing position (FIGS. 4A, 4B, and 4C), and the sealing apparatus 100 comprises an actuator (not depicted in the drawings) to cause the change in position of the sealing tool 101, and at least one control unit (not depicted in the drawings) which is communicated with said actuator and configured for controlling the actuation of the actuator.

The actuating elements 1 and 2 are configured for allowing the passage of a packaging material 3 therebetween (preferably a film tube such as the one described above) in the forward movement direction A when the sealing tool 101 is in the inactive position, with the actuating elements thereby being spaced apart in that situation, and are configured for cooperating with one another, and with said cooperation, transversely sealing at least a first portion of the packaging material 3 (portion facing the first actuating element 1) to a second portion of said packaging material 3 (portion facing the second actuating element 2) when the sealing tool 101 is in the sealing position.

Figure 5:
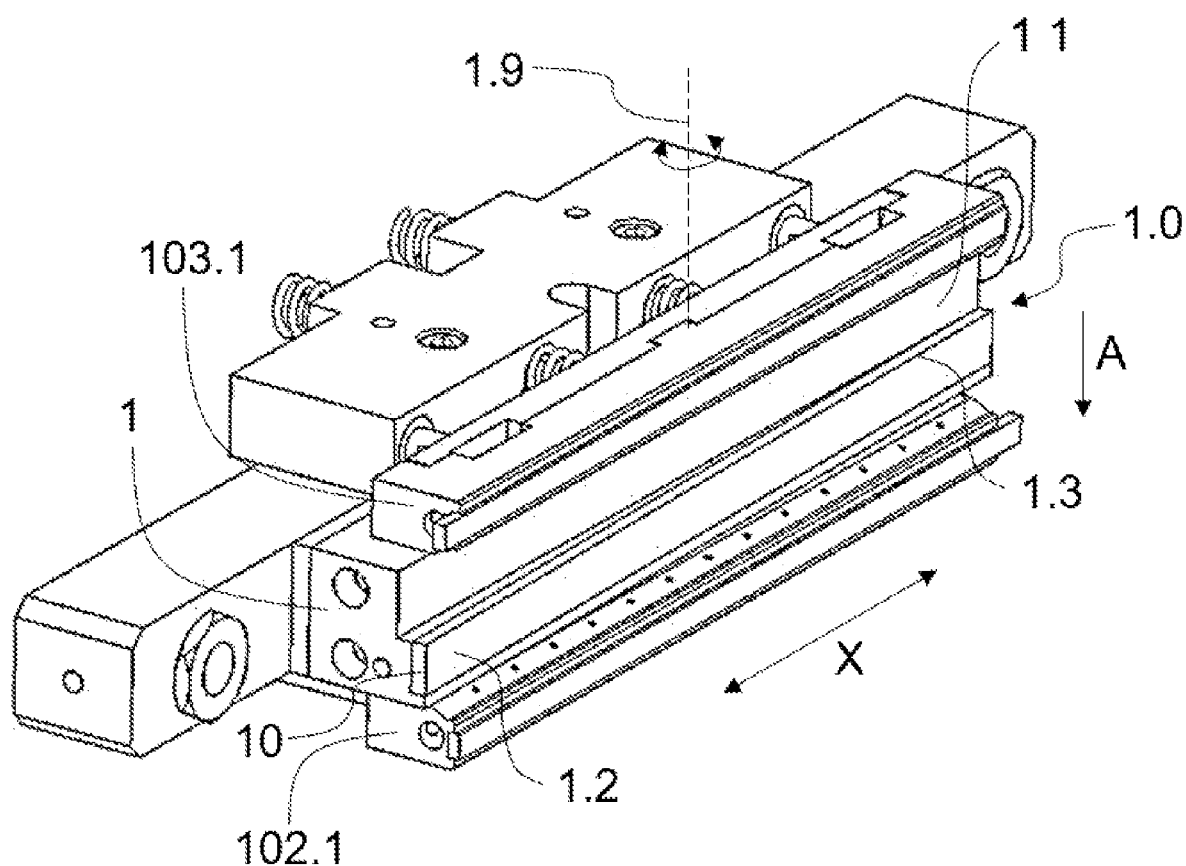
FIG. 5 shows a perspective view of the first actuating element of the sealing apparatus of FIG. 3A.

In the context of the invention, transverse sealing must be interpreted as sealing in direction X transverse to the forward movement direction A, which is more clearly shown in FIG. 5.

The sealing tool 101 is configured for changing position with the movement of at least one of the actuating elements 1 and 2 with respect to the other actuating element 1 and 2, although in a preferred embodiment both actuating elements 1 and 2 are moved (there being an actuator for moving each element, with both actuators being synchronized, or there being one and the same actuator for moving both actuating elements 1 and 2).

Figure 4A:
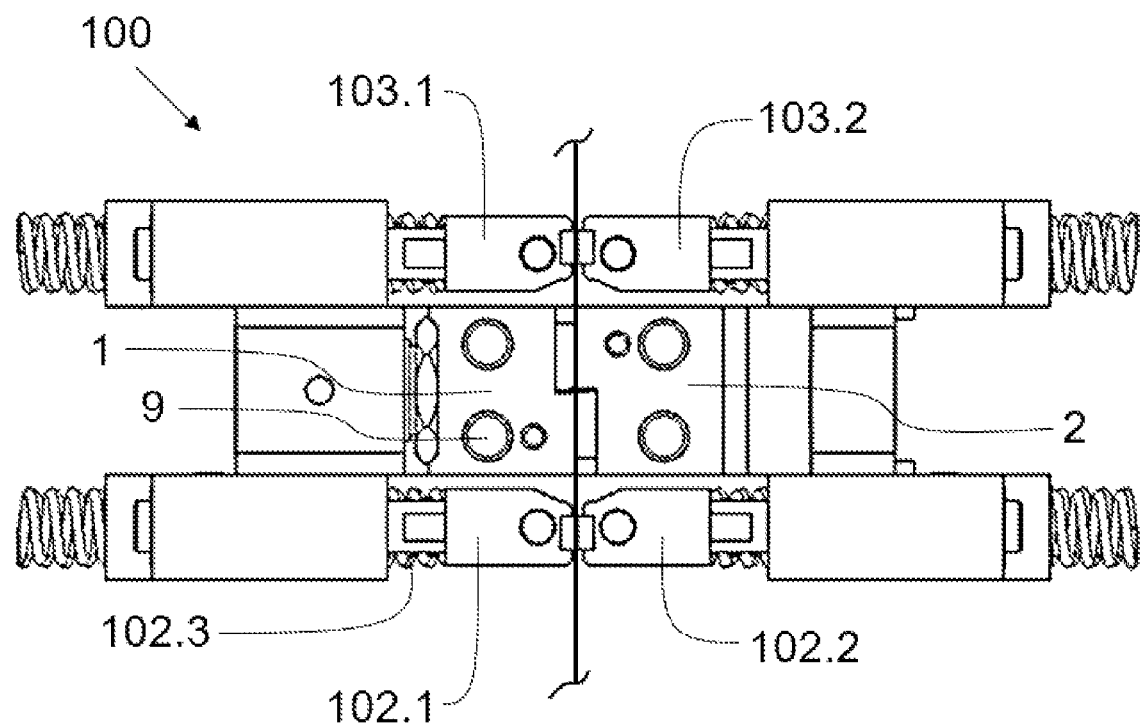
FIG. 4A is a side view of the sealing apparatus of FIG. 1 in the sealing position, with the packaging material between the actuating elements of said sealing apparatus.
Figure 4B:
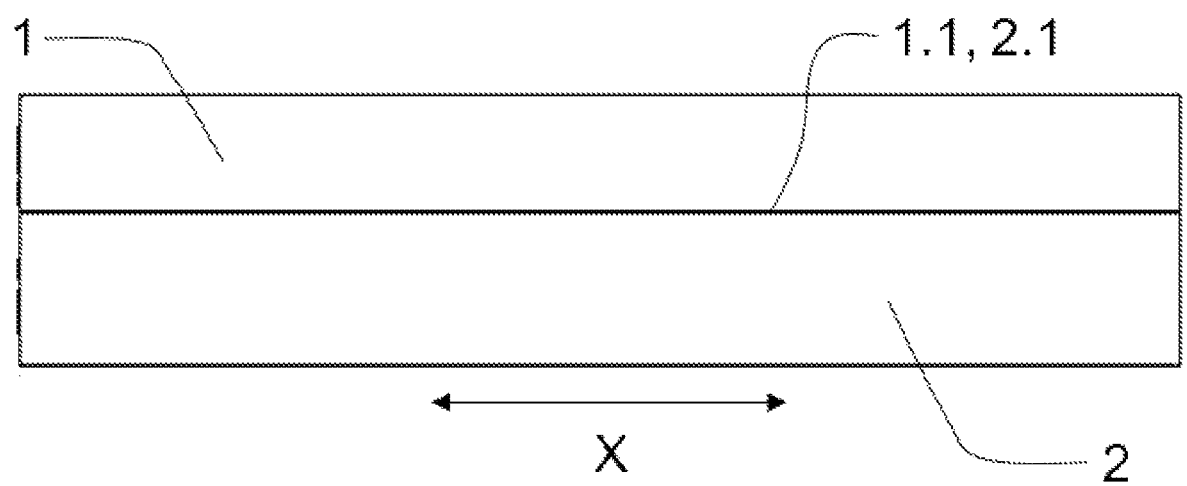
FIG. 4B is a plan view of the actuating elements of the sealing apparatus of FIG. 4A.
Figure 4C:
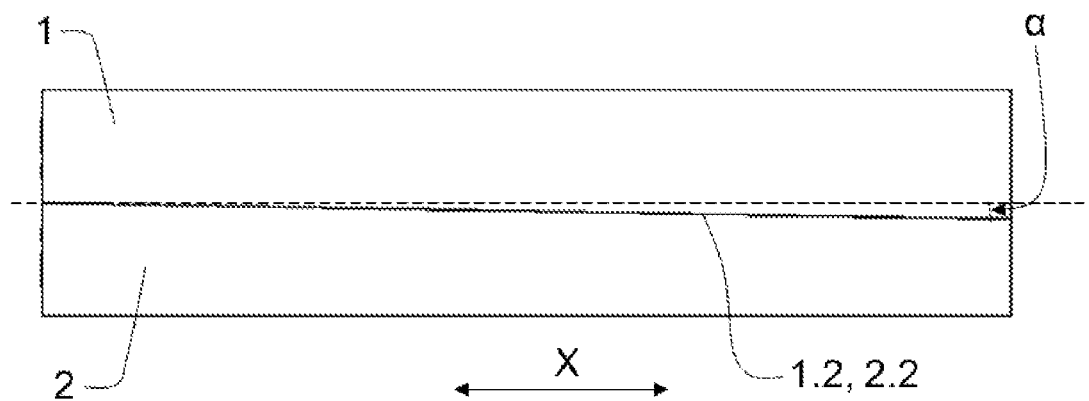
FIG. 4C is a bottom view of the actuating elements of the sealing apparatus of FIG. 4A.

The actuating surfaces 1.0 and 2.0 of both actuating elements 1 and 2 are configured for cooperating with the sealing tool 101 in the sealing position, as shown in FIG. 4A for example, to perform transverse sealing.

The sealing tool 101 is configured such that the actuating surfaces 1.0 and 2.0 of both actuating elements 1 and 2 retain between them at least the surface of the packaging material 3 comprising the first portion and the second portion, when said sealing tool 101 is in the sealing position, such that said actuating surfaces 1.0 and 2.0 are in contact with said packaging material 3. Therefore, said sealing can be performed using heat if at least one of said actuating surfaces 1.0 and 2.0 is heated.

In the embodiments in which sealing is performed using heat, the sealing tool 101 comprises at least one heating device, not depicted in the drawings, for heating at least one of the two actuating surfaces 1.0 and 2.0 of the sealing tool 101. The heating device is configured for heating at least one of the first sealing surfaces 1.1 and 2.1 of the actuating surfaces 1.0 and 2.0, and at least one of the second sealing surfaces 1.2 and 2.2 of the actuating surfaces 1.0 and 2.0, said device thereby being configured for heating at least one of the first sealing surfaces 1.1 and 2.1 in charge of performing transverse sealing in the first portion of the packaging material 3 and at least one of the second sealing surfaces 1.2 and 2.2 in charge of performing transverse sealing in the second portion of the packaging material 3. In some embodiments, the sealing tool 101 may comprise a heating device for each sealing surface 1.1, 1.2, 2.1 and 2.2 to be heated. Preferably, the heating device comprises a plurality of resistors, and each sealing element 1 and 2 comprises a plurality of holes 9 for housing the resistors (one housing 9 per resistor).

The actuating surfaces 1.0 and 2.0 of both actuating elements 1 and 2 are configured to also further cooperate with one another during the change in position of the sealing tool 101 to the sealing position, and to transversely cut said packaging material 3 during said change, with said additional cooperation. Therefore, when the sealing tool 101 reaches the sealing position, the packaging material 3 will have already been cut by the sealing tool 101 itself during the change in position thereof (with the additional cooperation), and in the sealing position the only function the sealing tool 101 must perform is to seal the packaging material 3. The transverse cut physically separates the packaging material 3 into two parts, a first part upstream and a second part downstream of the cut in the forward movement direction A.

In the context of the invention, transverse cut must be interpreted as a cut in direction X transverse to the forward movement direction A.

Each actuating surface 1.0 and 2.0 comprises a first sealing surface 1.1 and 2.1 and a second sealing surface 1.2 and 2.2 that are distributed in the forward movement direction A, and configured for making two transverse seals in the transversely cut packaging material 3: one seal in the first part and another seal in the second part. The respective sealing surfaces 1.1 and 1.2, and 2.1 and 2.2 of each actuating surface 1.0 and 2.0 are arranged one on top of the other in a staggered manner, such that the first sealing surfaces 1.1 and 2.1 of both actuating elements 1 and 2 are complementary to one another and the second sealing surfaces 1.2 and 2.2 of both actuating elements 1 and 2 are complementary to one another. Therefore, when the sealing tool 101 is in the sealing position, said first sealing surfaces 1.1 and 2.1 cooperate with one another and generate the transverse seal in the first part of the already transversely cut packaging material 3, and said second sealing surfaces 1.2 and 2.2 cooperate with one another and generate the transverse seal in the second part of said already transversely cut packaging material 3.

Each actuating surface 1.0 and 2.0 comprises a respective edge 1.3 and 2.3 defined between its two corresponding sealing surfaces 1.1 and 1.2, and 2.1 and 2.2, said edges 1.3 and 2.3 being configured for cooperating with one another, and with said cooperation, transversely cutting the packaging material 3 during the change in position of the sealing tool 101 to the sealing position. The staggered configuration of the actuating surfaces 1.0 and 2.0 allows making the transverse cut before the transverse seals described above.

In the context of the invention, staggered arrangement between two sealing surfaces must be interpreted to mean, on one hand, that both sealing surfaces are at a different level in the forward movement direction A, and on the other hand, that there is generated between both sealing surfaces of one and the same element an edge extending in direction X, i.e., (and in reference to the edge), in the area of the sealing surfaces immediately upstream and downstream of the corresponding edge, along direction X, the distance between said area of a sealing surface of an actuating element 1 and 2 and the packaging material 3 arranged between the two actuating elements 1 and 2 being different from the distance between said area of the other sealing surface of said actuating element 1 and 2 and said packaging material 3 (except at at least one intersecting point, in the case of some embodiments of the invention, as described in detail below). An actuating element may therefore have the following configurations (in different embodiments of the invention), for example:

The area of the first sealing surface, which is immediately upstream in the forward movement direction A of the corresponding edge, is closer to the packaging material 3 than the area of the second sealing surface, which is immediately downstream in the forward movement direction A of said edge, along the entire extension of the edge in direction X.

The area of the second sealing surface, which is immediately downstream in the forward movement direction A of the corresponding edge, is closer to the packaging material 3 than the area of the first sealing surface, which is immediately upstream in the forward movement direction A of said edge, along the entire extension of the edge in direction X.

At least a first part of the area of the first sealing surface, which is immediately upstream in the forward movement direction A of the corresponding edge, is closer to the packaging material 3 than the part of the area of the second sealing surface, which is immediately downstream in the forward movement direction A of the corresponding edge and which coincides with said first part of the first sealing surface in the forward movement direction A, and at least a second part of the area of the first sealing surface, which is immediately upstream in the forward movement direction A of the corresponding edge, is farther from the packaging material 3 than the part of the area of the second sealing surface, which is immediately downstream in the forward movement direction A of the corresponding edge and which coincides with said second part of the first sealing surface in the forward movement direction A. In this case, there is at least one intersecting point (or area) of both sealing surfaces which intersect (at different levels in the forward movement direction A) and are therefore arranged at one and the same distance with respect to said packaging material 3.

The edges 1.3 and 2.3 are not facing each other but are misaligned in the forward movement direction A, with one of the edges 1.3 and 2.3 being arranged downstream in the forward movement direction A with respect to the other edge 1.3 and 2.3. The cut generated by said edges 1.3 and 2.3 is therefore not caused by both edges 1.3 and 2.3 impacting one another, and said cut does not cause the wear of said edges 1.3 and 2.3 (or at least not to the extent of the prior art). Therefore, the service life of the actuating elements 1 and 2 is not affected despite the inclusion of the cutting function, or at least increased with respect to the prior art in which the wear of the elements involved in generating the cut is more pronounced. The edges 1.3 and 2.3 are thereby configured such that, when they cooperate with one another for transversely cutting the packaging material 3, both edges 1.3 and 2.3 overlap.

Preferably, the edges 1.3 and 2.3 are configured to overlap in a progressive manner, such that the packaging material 3 is progressively cut as the corresponding actuating element 1 and 2 moves towards the other actuating element 1 and 2 (or as both actuating elements 1 and 2 move), like how a pair of scissors works. The cut is therefore generated in a safer and more controlled manner, without the risk of tearing the packaging material 3, for example. The edges 1.3 and 2.3 extend, not parallel to one another, in direction X, and this non-parallelism allows the described progressive cutting.

Figure 6A:
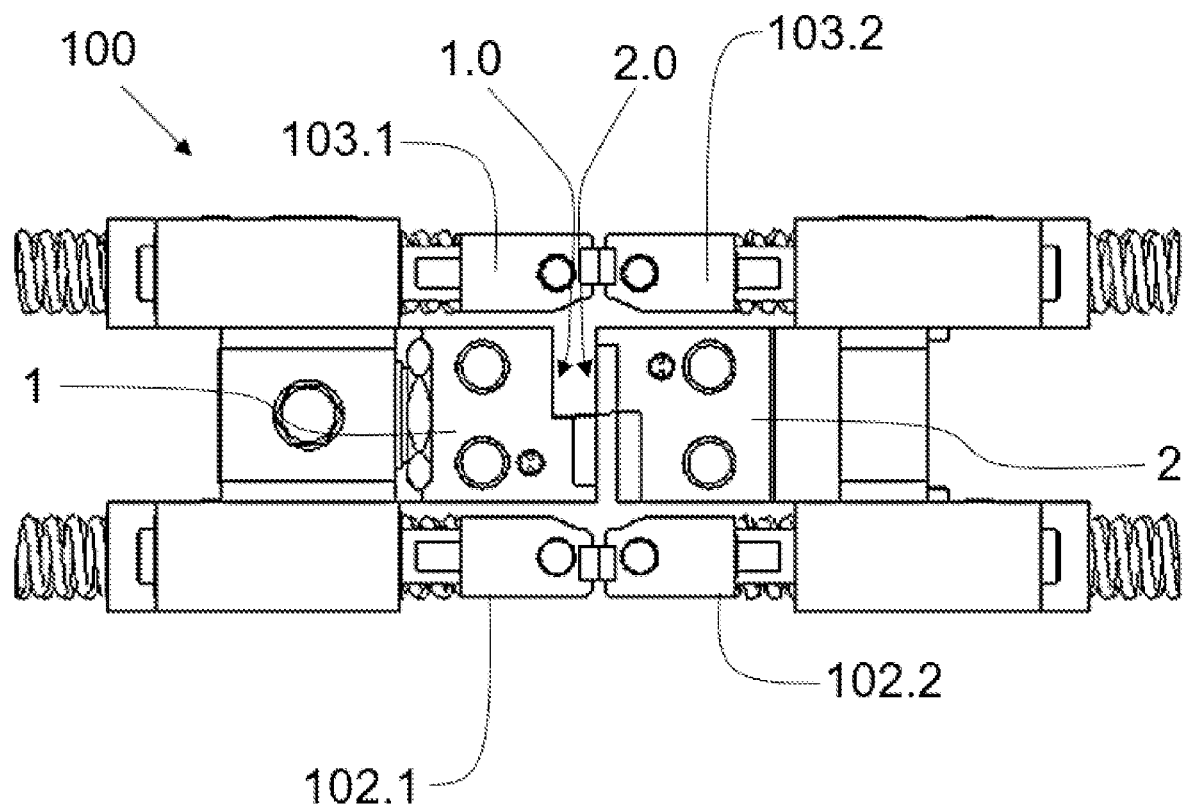
FIG. 6A is a side view of the sealing apparatus of FIG. 1 in the first overlapping position.
Figure 6B:
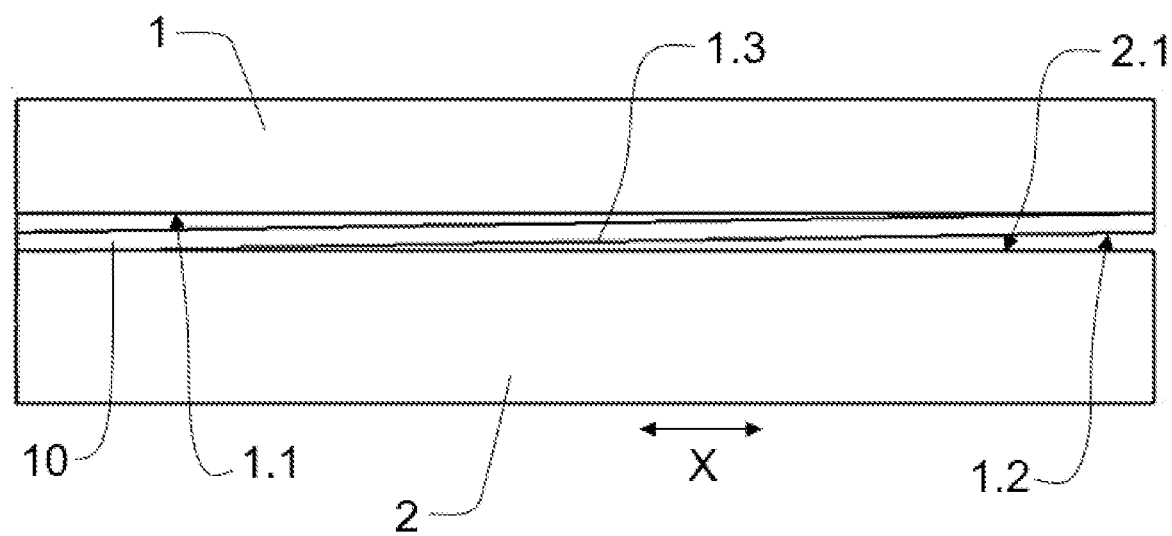
FIG. 6B is a plan view of the actuating elements of the sealing apparatus of FIG. 6A.
Figure 6C:
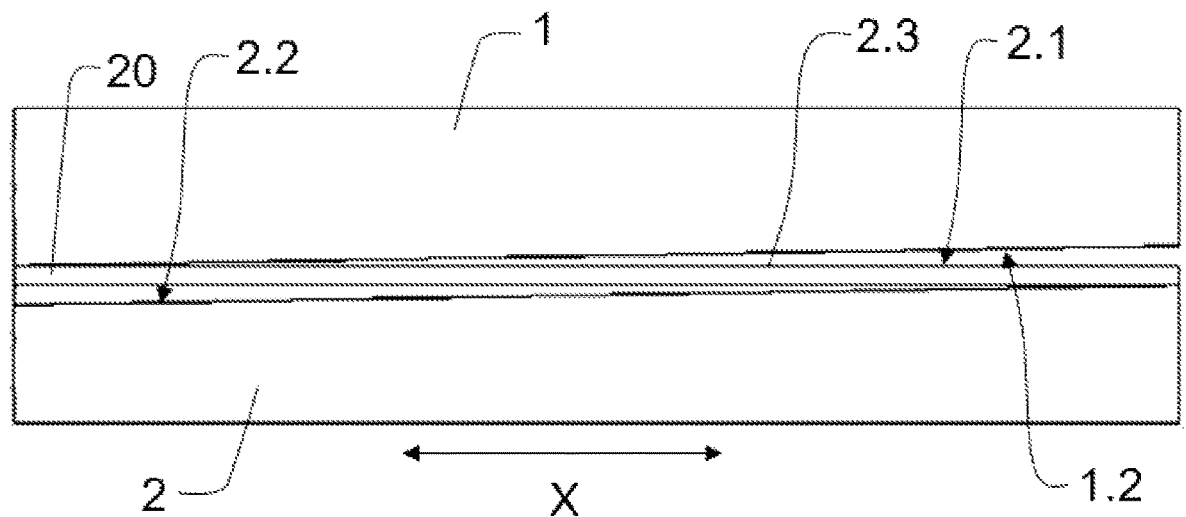
FIG. 6C is a bottom view of the actuating elements of the sealing apparatus of FIG. 6A.
Figure 7A:
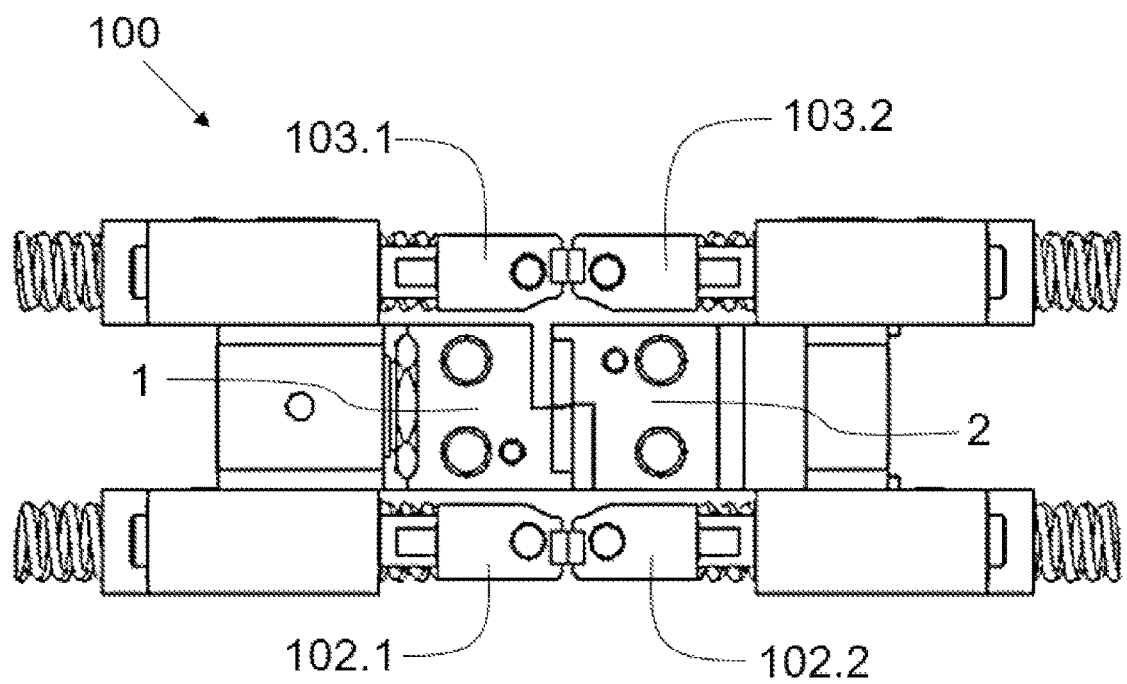
FIG. 7A is a side view of the sealing apparatus of FIG. 1 in the second overlapping position.
Figure 7B:
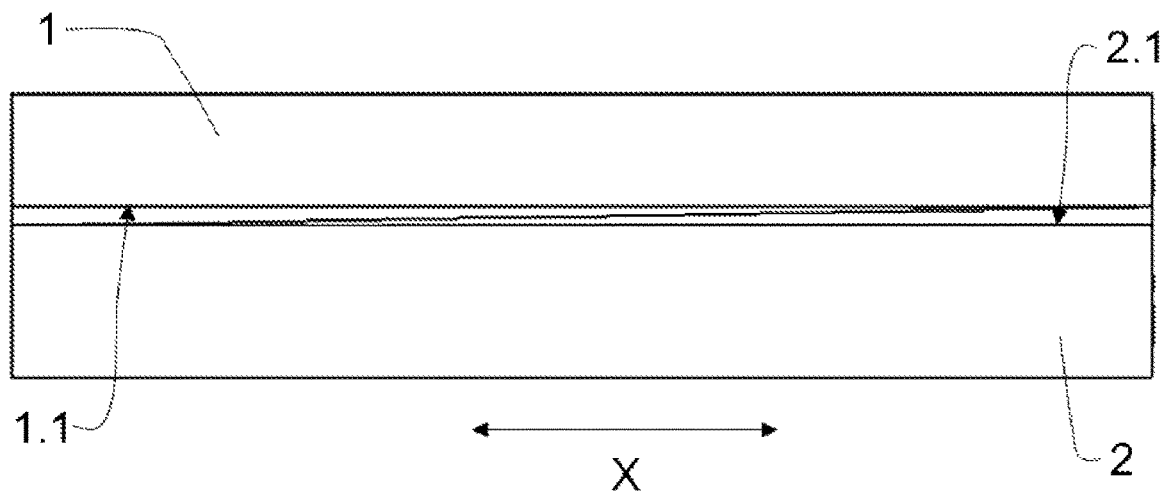
FIG. 7B is a plan view of the actuating elements of the sealing apparatus of FIG. 7A.
Figure 7C:
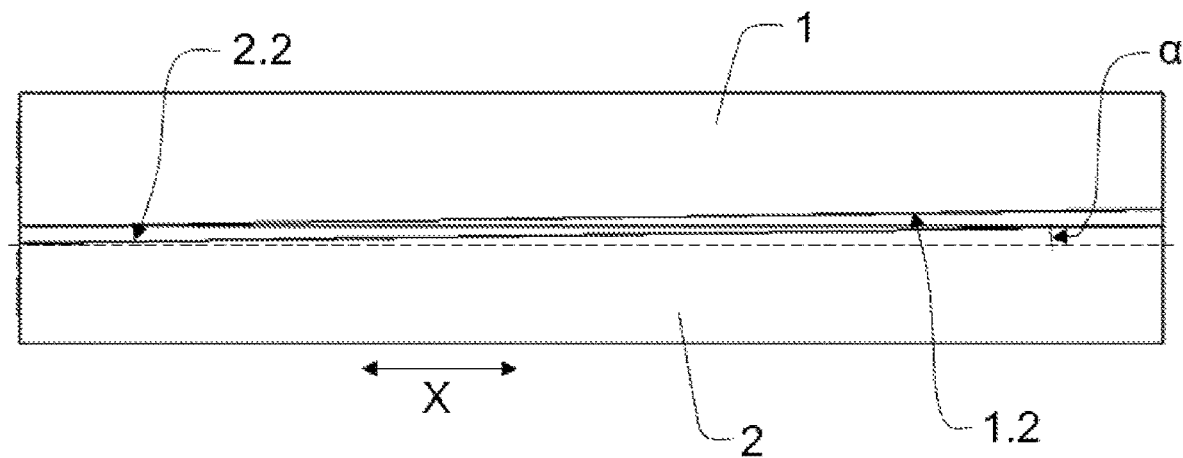
FIG. 7C is a bottom view of the actuating elements of the sealing apparatus of FIG. 7A.

The packaging material 3 is thereby transversely cut between a first overlapping position of the sealing tool 101, which is the position of said sealing tool 101 in which the edges 1.3 and 2.3 start to cooperate with one another to perform said transverse cut depicted by way of example in FIGS. 6A, 6B, and 6C (the point where the edges 1.3 and 2.3 cooperate with one another for first time is shown on the left side of FIG. 6B), and a second overlapping position of the sealing tool 101 which is the position of said sealing tool 101 in which the edges 1.3 and 2.3 no longer cooperate with one another after making said transverse cut depicted by way of example in FIGS. 7A, 7B, and 7C. Both overlapping positions are between the inactive position and the sealing position of the sealing tool 101. If the edges 1.3 and 2.3 extend parallel to one another in direction X, the entire length of the edges 1.3 and 2.3 in said direction X would overlap at the same time, so progressive cutting like the one described would not be achieved. To make it easier to perform cutting, at least one of the edges 1.3 and 2.3 is a sharp edge.

In any of the embodiments, each actuating element 1 and 2 may comprise an auxiliary element 10 and 20 comprising the corresponding edge 1.3 and 2.3. In this manner, if for any reason (wear or improper use, for example) there is a need to change a sealing surface 1.1, 1.2, 2.1, or 2.2 or sharpen an edge 1.3 or 2.3, replacing or sharpening the corresponding auxiliary element 10 or 20 would suffice instead of having to replace or sharpen the corresponding actuating element 1 and 2 as a whole. Furthermore, changing said auxiliary elements 10 and 20 for other auxiliary elements with different surfaces also allows generating seals of different shapes with one and the same actuating element 1 and 2. The auxiliary element 10 and 20 can be made of the same material as the rest of the actuating element 1 and 2, or it can be made of another material (in this case, it would preferably be a stronger, heat-conducting material).

In the preferred embodiment, the actuating elements 1 and 2 are configured such that the first sealing surfaces 1.1 and 2.1 are the same, hence being parallel to one another in direction X, and the second sealing surfaces 2.1 and 2.2 are the same, hence being parallel to one another.

Preferably, like in the preferred embodiment, for example, the actuating surfaces 1.0 and 2.0 comprise a specific length in direction X transverse to the forward movement direction A, which is the length of the edges 1.3 and 2.3 in said direction X. Said length is equal to or larger than the length of the packaging material 3 in said direction X, and the planes defining the edges 1.3 and 2.3 in the forward movement direction A, with the sealing tool 101 in the inactive position, do not intersect one another along said length. With this configuration, the packaging material 3 is cut from one lateral end to another as the sealing tool 101 moves from the first overlapping position to the second overlapping position, like a pair of scissors, greatly assuring proper cutting of the packaging material 3. This evolution can be deduced from FIGS. 6B and 7B, for example.

In the preferred embodiment, the edges 1.3 and 2.3 extend from one end in a straight line in direction X, with a specific angle α being defined between both edges 1.3 and 2.3. In the preferred embodiment, the sealing surfaces 1.1, 1.2, 2.1 and 2.2 also extend in a straight line in direction X.

In other embodiments, the edges 1.3 and 2.3 are configured with other shapes and the corresponding planes in the forward movement direction A may intersect, for example, in the cases where the packaging material 3 would not be cut from one lateral end to another.

Figure 8:
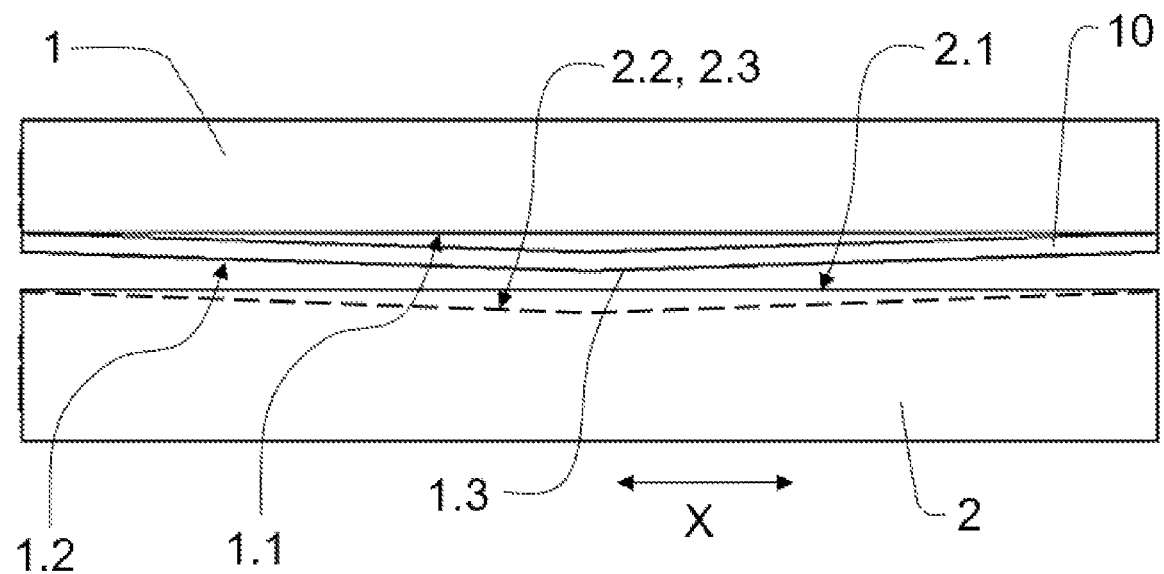
FIG. 8 is a plan view of the actuating elements of another embodiment of the sealing apparatus.
Figure 9:
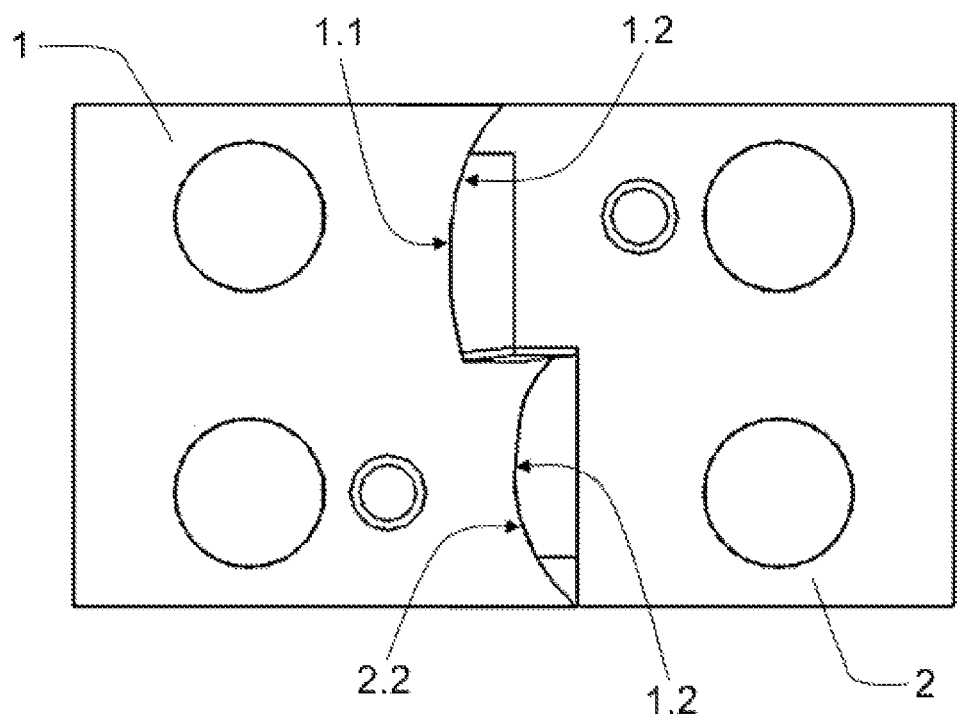
FIG. 9 laterally shows the actuating elements of another embodiment of the sealing apparatus.

In other embodiments, such as the embodiment shown in FIG. 8, for example, at least one of the sealing surfaces 1.1 and 2.1 and/or 1.2 and 2.2, and the complementary sealing surface of the other actuating element 1 or 2, extends in a non-linear manner in direction X and/or in the forward movement direction A. In summary, the proposed apparatus 100 can be implemented with sealing surfaces of different configurations, complying with the required function for said apparatus 100, such as the configuration shown in FIG. 9, for example.

The apparatus 100 may further comprise in any of the embodiments a positioning device, not depicted in the drawings, associated with at least one sealing surface 1.1, 1.2, 2.1 and/or 2.2, which device is suitable for causing at least the rotation of said sealing surface 1.1, 1.2, 2.1 and/or 2.2 with respect to an axis extending in the forward movement direction A. Said axis can be a central axis 1.9 like the one shown in FIG. 5, for example. This, for example, allows adjusting the cooperation between the actuating elements 1 and 2 during cutting and/or sealing. In the case where said sealing surface 1.1, 1.2, 2.1 and/or 2.2 is arranged on an auxiliary element 10 and 20, it would suffice to rotate said auxiliary element 10 or 20 instead of the corresponding actuating element 1 and 2.

In the preferred embodiment, the sealing apparatus 100 further comprises a lower hold-down plate 102 downstream of the sealing tool 101 in the forward movement direction A, comprising a first lower hold-down element 102.1 and a second lower hold-down element 102.2 facing each other and between which the packaging material 3 is arranged. The first lower hold-down element 102.1 is associated with the first actuating element 1 of the sealing tool 101, and the second lower hold-down element 102.2 is associated with the second actuating element 2 of said sealing tool 101, such that each lower hold-down element 102.1 and 102.2 moves integrally with the actuating element 1 or 2 with which it is associated. In the preferred embodiment, this association is a physical attachment, but in other embodiments this association may be achieved through the corresponding actuator which is controlled, for example, so that it moves integrally or simultaneously and along with the associated actuating element 1 or 2. The actuator can be a piston or cylinder, for example.

In the preferred embodiment, both lower hold-down elements 102.1 and 102.2 are associated with the corresponding actuating element 1 or 2 with relative freedom of movement with respect to said actuating element 1 or 2, and said movement is caused by means of a respective elastic element 102.3 (a spring, for example). This allows, once the lower hold-down elements 102.1 and 102.2 start to cooperate with one another, said cooperation to not prevent the sealing tool 101 from continuing to change position to the sealing position.

In other embodiments, another element instead of an elastic element is used, or the lower hold-down elements 102.1 and 102.2 themselves may even be those which undergo deformation while the sealing tool 101 continues to change position to the sealing position, the lower hold-down plate elements 102.1 and/or 102.2 comprising, in these cases, foams, sponges, gums, or other deformable materials.

In other embodiments, only one of the lower hold-down elements 102.1 and 102.2 is associated with the corresponding actuating element 1 or 2 with relative freedom of movement with respect to said actuating element 1 or 2. In some embodiments, the lower hold-down element 102.1 and/or 102.2 which is associated with the corresponding actuating element 1 or 2 with relative freedom of movement with respect to said actuating element 1 or 2 comprises an additional associated actuator to cause said relative movement instead of an elastic element, where this distance can be adjusted, where required, as a result of controlling the actuation of said actuator.

Depending on the embodiment of the sealing apparatus, said apparatus may comprise different advantages as described below.

The lower hold-down elements 102.1 and 102.2 are configured for retaining between them the packaging material 3 arranged therebetween when they cooperate with one another, which elements being configured for cooperating with one another during the change in position of the sealing tool 101 to the sealing position, at least between the first overlapping position of the sealing tool 101 and the sealing position of the sealing tool 101, and preferably also for cooperating with one another before the edges 1.3 and 2.3 start to cooperate with one another during said change in position. This therefore assures, on one hand, that creases which may lead to imperfections in the final container are not generated in the packaging material 3 both during cutting and sealing, and on the other hand, that the packaging material 3 does not break or tear during cutting as a result of the weight it has downstream of the sealing apparatus 100 in the forward movement direction A due to the presence of the product, and that it does not fall uncontrollably before the corresponding seals are made on the packaging material 3.

In some embodiments, like in the case of the preferred embodiment, for example, the lower hold-down plate 102 is configured so that the distance between the two lower hold-down elements 102.1 and 102.2 is equal to or less than the smallest distance between the two edges 1.3 and 2.3, with the sealing tool 101 in the inactive position. In that sense, during the change in position of the sealing tool 101 to the sealing position, the lower hold-down elements 102.1 and 102.2 start to cooperate with one another when the edges 1.3 and 2.3 start to cooperate with one another (when the sealing tool 101 reaches the first overlapping position), or said lower hold-down elements 102.1 and 102.2 start to cooperate with one another before the edges 1.3 and 2.3 do (before the sealing tool 101 reaches the first overlapping position). The lower hold-down elements 102.1 and 102.2 maintain said cooperation at least until the transverse seals are made, as described above, thereby assuring that the packaging material 3 does not move during cutting or after it has been cut, in turn allowing a clean cut and a more efficient sealing.

In the preferred embodiment, the first lower hold-down element 102.1 comprises a transverse surface in direction X extending parallel to the transverse surface in direction X of the second sealing surface 1.2 of the first actuating element 1, and the second lower hold-down element 102.2 comprises a transverse surface in direction X extending parallel to the transverse surface in direction X of the second sealing surface 2.2 of the second of actuation 2. In other words, with the sealing tool 101 in the sealing position, the first lower hold-down element 102.1 is configured for being arranged coplanar to the plane where the second actuating surface 1.2 of the first actuating element 1 is arranged, and the second lower hold-down element 102.2 is configured for being arranged coplanar to the plane where the second actuating surface 2.2 of the second actuating element 2 is arranged. This allows holding down the packaging material 3 with the same orientation and direction as the orientation and direction in which transverse sealing is performed in the second part of the packaging material 3, preventing the generation of creases during sealing and the generation of unsealed areas.

In some embodiments, like in the case of the preferred embodiment, for example, the sealing apparatus 100 further comprises an upper hold-down plate 103 upstream of the sealing tool 101 in the forward movement direction A. The upper hold-down plate 103 comprises a first upper hold-down element 103.1 and a second upper hold-down element 103.2 facing each other and between which the packaging material 3 is arranged, the first upper hold-down element 103.1 being associated with the first actuating element 1 and the second upper hold-down element 103.2 associated with the second actuating element 2, such that each upper hold-down element 103.1 and 103.2 moves integrally with the actuating element 1 and 2 with which it is associated. At least one of said upper hold-down elements 103.1 and 103.2 associated with the corresponding actuating element 1 and 2 with relative freedom of movement with respect to said actuating element 1 and 2.

The configuration of the upper hold-down plate 103 can be the same as the lower hold-down plate 102, so everything described above for the lower hold-down plate is also analogously valid for the upper hold-down plate 103. Therefore, the upper hold-down plate 103 may comprise the different configurations described above for the lower hold-down plate 102.

Similarly, the sealing apparatus 100 may comprise in some embodiments an upper hold-down plate 103 and a lower hold-down plate 102 that are analogous to one another or may comprise lower hold-down plates 102 and upper hold-down plates 103 with different configurations, where embodiments with different combinations of lower and upper hold-down plates can be obtained.

These and other embodiments are disclosed in the clauses that follow.

Clause 1. Sealing apparatus for a packaging machine, comprising a sealing tool (101) that is movable between an inactive position and a sealing position, the sealing tool (101) comprising two facing actuating elements (1, 2), each with a respective actuating surface (1.0, 2.0), and both actuating surfaces (1.0, 2.0) facing each other, the actuating elements (1, 2) being configured for allowing the passage of a packaging material (3) therebetween in a forward movement direction (A) when the sealing tool (101) is in the inactive position, and for transversely sealing at least a first portion of the packaging material (3) to a second portion of said packaging material (3) when the sealing tool (101) is in the sealing position, the actuating surfaces (1.0, 2.0) of both actuating elements (1, 2) being configured for cooperating with one another to perform transverse sealing, and the sealing tool (101) being configured for changing position with the movement of at least one of the actuating elements (1, 2) with respect to the other actuating element (1, 2), the sealing tool (101) being configured so that the actuating surfaces (1.0, 2.0) of both actuating elements (1, 2) retain between them the corresponding portion of the packaging material (3) in the sealing position, and so that said actuating surfaces (1.0, 2.0) furthermore cooperate with one another during the change in position of said sealing tool (101) to the sealing position, and transversely cut said packaging material (3) during said change, with said cooperation, each actuating surface (1.0, 2.0) comprises a first sealing surface (1.1, 2.1) and a second sealing surface (1.1, 2.1) that are distributed in the forward movement direction (A), the corresponding sealing surfaces (1.1, 1.2, 2.1, 2.2) of each actuating surface (1.0, 2.0) being arranged one on top of the other in a staggered manner such that the first sealing surfaces (1.1, 2.1) of both actuating surfaces (1.0, 2.0) are complementary to one another and the second sealing surfaces (1.2, 2.2) of both actuating surfaces (1.0, 2.0) are complementary to one another, and each actuating surface (1.0, 2.0) comprising an edge (1.3, 2.3) defined between its two sealing surfaces (1.1, 1.2; 2.1, 2.2), with one of the edges (1.3, 2.3) being arranged downstream in the forward movement direction (A) with respect to the other edge (1.3, 2.3) and with said edges (1.3, 2.3) being configured for cooperating with one another during the change in position of the sealing tool (101) to the sealing position, and for transversely cutting the packaging material (3) with said cooperation during said change.

Clause 2. Sealing apparatus according to claim 1, wherein the edges (1.3, 2.3) are configured so that, when they cooperate with one another for transversely cutting the packaging material (3), both edges (1.3, 2.3) overlap one another, said edges (1.3, 2.3) furthermore being configured to overlap in a progressive manner, such that said packaging material (3) is transversely cut between a first overlapping position of the sealing tool (101) which is the position of said sealing tool (101) in which the edges (1.3, 2.3) start to cooperate with one another to perform said transverse cut, and a second overlapping position of the sealing tool (101) which is the position of said sealing tool (101) in which the edges (1.3, 2.3) no longer cooperate with one another after completing said transverse cut, both overlapping positions being between the inactive position and the sealing position of the sealing tool (101).

Clause 3. Sealing apparatus according to claim 2, wherein the planes defining the first sealing surfaces (1.1, 2.1) of the actuating surfaces (1.0, 2.0) of the actuating elements (1, 2) in the forward movement direction (A) are not parallel to the planes defining the second sealing surfaces (1.1, 2.2) of the actuating elements (1, 2) in said forward movement direction (A).

Clause 4. Sealing apparatus according to claim 3, wherein the actuating surfaces (1.0, 2.0) comprise a specific length in a direction transverse to the forward movement direction (A), and the planes defining the corresponding first sealing surfaces (1.1, 2.1) in the forward movement direction (A) do not intersect with the planes defining the corresponding second sealing surfaces (1.2, 2.2) in said forward movement direction (A) along said length.

Clause 5. Sealing apparatus according to any of claims 2 to 4, comprising a positioning device associated with at least one sealing surface (1.1, 1.2, 2.1, 2.2), which is suitable for causing at least the rotation of said actuating surface (1.1, 1.2, 2.1, 2.2) with respect to an axis extending in the forward movement direction (A).

Clause 6. Sealing apparatus according to any of claims 2 to 5, comprising a lower hold-down plate (102) downstream of the sealing tool (101) in the forward movement direction (A), said lower hold-down plate comprising a first lower hold-down element (102.1) and a second lower hold-down element (102.2) facing each other and between which the packaging material (3) is arranged, the first lower hold-down element (102.1) being associated with the first actuating element (1), and the second lower hold-down element (102.2) being associated with the second actuating element (2), such that each lower hold-down element (102.1, 102.2) moves integrally with the actuating element (1, 2) with which it is associated, at least one of said lower hold-down elements (102.1, 102.2) being associated with the corresponding actuating element (1, 2) with relative freedom of movement with respect to said actuating element (1, 2).

Clause 7. Sealing apparatus according to claim 6, wherein the lower hold-down elements (102.1, 102.2) are configured for retaining between them the packaging material (3) arranged therebetween when they cooperate with one another, being configured for cooperating with one another during the change in position of the sealing tool (101) at least from the first overlapping position of the sealing tool (101) to the sealing position.

Clause 8. Sealing apparatus according to claim 6 or 7, wherein the distance between the lower hold-down elements (102.1, 102.2) is equal to or less than the smallest distance between the edges (1.3, 2.3) with the sealing tool (101) in the inactive position, and the lower hold-down element (102.1, 102.2) which is associated with an actuating element (1, 2) with relative freedom of movement being attached to said actuating element (1, 2) by means of an elastic element (102.3) which allows the relative movement thereof with respect to said actuating element (1, 2).

Clause 9. Sealing apparatus according to any of claims 6 to 8, wherein the first lower hold-down element (102.1) comprises a transverse surface extending parallel to the transverse surface of the second sealing surface (1.2) of the first actuating element (1), and the second lower hold-down element (102.2) comprises a transverse surface extending parallel to the transverse surface of the second sealing surface (2.2) of the second actuating element (2).

Clause 10. Sealing apparatus according to any of claims 2 to 9, comprising an upper hold-down plate (103) upstream of the sealing tool (101) in the forward movement direction (A), said upper hold-down plate comprising a first upper hold-down element (103.1) and a second upper hold-down element (103.2) facing each other and between which the packaging material (3) is arranged, the first upper hold-down element (103.1) being associated with the first actuating element (1), and the second upper hold-down element (103.2) being associated with the second actuating element (2), such that each upper hold-down element (103.1, 103.2) moves integrally with the actuating element (1, 2) with which it is associated, at least one of said upper hold-down elements (103.1, 103.2) being associated with the corresponding actuating element (1, 2) with relative freedom of movement with respect to said actuating element (1, 2).

Clause 11. Sealing apparatus according to claim 10, wherein the upper hold-down elements (103.1, 103.2) are configured for retaining between them the packaging material (3) arranged therebetween when they cooperate with one another, being configured for cooperating with one another during the change in position of the sealing tool (101) to the sealing position at least between the first overlapping position of the sealing tool (101) and the second overlapping position of the sealing tool (101).

Clause 12. Sealing apparatus according to claim 10 or 11, wherein the distance between the upper hold-down elements (103.1, 103.2) is equal to or less than the smallest distance between the edges (1.3, 2.3) with the sealing tool (101) in the inactive position, the upper hold-down element (103.1, 103.2) which is associated with an actuating element (1, 2) with relative freedom of movement being attached to said actuating element (1, 2) by means of an elastic element (103.3) which allows the relative movement thereof with respect to said actuating element (1, 2).

Clause 13. Sealing apparatus according to any of claims 10 to 12, wherein the first upper hold-down element (103.1) comprises a transverse surface extending parallel to the transverse surface of the first sealing surface (1.1) of the first actuating element (1), and the second upper hold-down element (103.2) comprises a transverse surface extending parallel to the transverse surface of the first sealing surface (2.2) of the second of actuation (2).

Clause 14. Sealing apparatus according to any of claims 1 to 13, wherein the sealing tool (101) is configured for transversely sealing the packaging material (3) using heat, the sealing tool (101) comprising at least one heating device for heating at least one of the two actuating surfaces (1.0, 2.0).

What is claimed is:

1. A sealing apparatus for a packaging machine, the sealing apparatus comprising a sealing tool that is movable between an inactive position and a sealing position, the sealing tool including first and second actuating elements that face one another, each of the first and second actuating elements respectively having first and second actuating surface that face one another, the first and second actuating elements being configured to allow the passage of a packaging material between them in a forward movement direction when the sealing tool is in an inactive position, the first and second actuating elements being configured to transversely seal at least a first portion of the packaging material to a second portion of the packaging material when the sealing tool is in a sealing position, the first and second actuating surfaces being configured to cooperate with one another to perform the transverse sealing, at least one of the first and second actuating elements being moveable with respect to the other when changing between the inactive position and the sealing position, each of the first and second actuating surfaces comprising first and second sealing surfaces, each of the first sealing surfaces being located above the respective second sealing surface, the first and second sealing surface of each of the first and second actuating surfaces being arranged staggered with respect to one another in the forward movement direction, the first sealing surface of the first actuating surface and the first sealing surface of the second actuating surface being complementary to one another, the second sealing surface of the first actuating surface and the second sealing surface of the second actuating surface being complementary to one another, each of the first and second actuating surfaces respectively including a first edge and a second edge, with one of the first and second edges being arranged downstream in the forward movement direction with respect to the other of the first and second edge, the first and second edge being configured to cooperate with one another during the sealing tool changing from the inactive position to the sealing position to cause a transverse cutting of the packaging material, the first and second edges being configured to overlap with one another when causing the transverse cutting of the packaging material, the first and second edges being configured to overlap in a progressive manner, such that the packaging material is transversely cut between a first overlapping position of the sealing tool which is the position of the sealing tool in which the first and second edges start to cooperate with one another to perform the transverse cut, and a second overlapping position of the sealing tool which is the position of the sealing tool in which the first and second edges no longer cooperate with one another after completing the transverse cut, both of the first and second overlapping positions being between the inactive position and the sealing position of the sealing tool.

2. The sealing apparatus according to claim 1, wherein the first and second sealing surfaces of the first actuating surface respectively lie in a first plane and a second plane, and the first and second sealing surfaces of the second actuating surface respectively lie in a third plane and a fourth plane, the first and second planes not being parallel with one another in the forward movement direction, the third and fourth planes not being parallel with one another in the forward movement direction.

3. The sealing apparatus according to claim 2, wherein each of the first and second actuating surfaces respectively has a first length and a second length in a direction transverse to the forward movement direction, the first plane and the second plane do not intersect in the forward movement direction along the first length, the third plane and the fourth plane do not intersect in the forward movement direction along the second length.

4. The sealing apparatus according to claim 1, wherein one or both of the first and second actuating elements is rotatable with respect to an axis extending in the forward movement direction.

5. The sealing apparatus according to claim 1, further comprising a lower hold-down plate downstream of the sealing tool in the forward movement direction, the lower hold-down plate including a first lower hold-down element and a second lower hold-down element facing each other and between which the packaging material is configured to be arranged, the first lower hold-down element being associated with the first actuating element, and the second lower hold-down element being associated with the second actuating element, such that each of the first and second lower hold-down elements respectively moves integrally with the first and second actuating element to cause a clamping of the packaging material between the first and second lower hold-down elements when the sealing tool is moved towards the sealing position.

6. The sealing apparatus according to claim 5, wherein the first lower hold-down element has freedom of movement with respect to the first actuating element.

7. The sealing apparatus according to claim 6, wherein the second lower hold-down element has freedom of movement with respect to the second actuating element.

8. The sealing apparatus according to claim 7, wherein the second lower hold-down element is continuously urged in a direction towards the first lower hold-down element by a second elastic element.

9. The sealing apparatus according to claim 5, wherein the first lower hold-down element is continuously urged in a direction towards the second lower hold-down element by a first elastic element.

10. The sealing apparatus according to claim 5, wherein the distance between the first and second lower hold-down elements is equal to or less than a smallest distance between the first and second edges with the sealing tool in the inactive position.

11. The sealing apparatus according to claim 5, wherein when the sealing tool is in the sealing position the first lower hold-down element is arranged coplanar to the second actuating surface of the first actuating element, and the second lower hold-down element is arranged coplanar to the second actuating surface of the second actuating element.

12. The sealing apparatus according to claim 5, further comprising an upper hold-down plate upstream of the sealing tool in the forward movement direction, the upper hold-down plate including a first upper hold-down element and a second upper hold-down element facing each other and between which the packaging material is configured to be arranged, the first upper hold-down element being associated with the first actuating element, and the second upper hold-down element being associated with the second actuating element, such that each of the first and second upper hold-down elements respectively moves integrally with the first and second actuating element to cause a clamping of the packaging material between the first and second upper hold-down elements when the sealing tool is moved towards the sealing position.

13. The sealing apparatus according to claim 1, further comprising an upper hold-down plate upstream of the sealing tool in the forward movement direction, the upper hold-down plate including a first upper hold-down element and a second upper hold-down element facing each other and between which the packaging material is configured to be arranged, the first upper hold-down element being associated with the first actuating element, and the second upper hold-down element being associated with the second actuating element, such that each of the first and second upper hold-down elements respectively moves integrally with the first and second actuating element to cause a clamping of the packaging material between the first and second upper hold-down elements when the sealing tool is moved towards the sealing position.

14. The sealing apparatus according to claim 13, wherein the distance between the first and second upper hold-down elements is equal to or less than a smallest distance between the first and second edges with the sealing tool in the inactive position.

15. The sealing apparatus according to claim 13, wherein at least one of the first and second upper hold-down elements respectively has freedom of movement with respect to the first and second actuating element.

16. The sealing apparatus according to claim 13, wherein at least one of the first and second upper hold-down elements is continuously urged in a direction towards the other of the first and second upper hold-down elements.

17. The sealing apparatus according to claim 13, wherein when the sealing tool is in the sealing position the first upper hold-down element is arranged coplanar to the second actuating surface of the first actuating element, and the second upper hold-down element is arranged coplanar to the second actuating surface of the second actuating element.

18. The sealing apparatus according to claim 1, wherein the sealing tool is configured to transversely seal the packaging material using heat, the sealing tool comprising at least one heating device for heating at least one of the first and second actuating surfaces.

19. A sealing apparatus for a packaging machine, the sealing apparatus comprising a sealing tool that is movable between an inactive position and a sealing position, the sealing tool including first and second actuating elements that face one another, each of the first and second actuating elements respectively having first and second actuating surface that face one another, the first and second actuating elements being configured to allow the passage of a packaging material between them in a forward movement direction when the sealing tool is in an inactive position, the first and second actuating elements being configured to transversely seal at least a first portion of the packaging material to a second portion of the packaging material when the sealing tool is in a sealing position, the first and second actuating surfaces being configured to cooperate with one another to perform the transverse sealing, at least one of the first and second actuating elements being moveable with respect to the other when changing between the inactive position and the sealing position, each of the first and second actuating surfaces comprising first and second sealing surfaces, each of the first sealing surfaces being located above the respective second sealing surface, the first and second sealing surface of each of the first and second actuating surfaces being arranged staggered with respect to one another in the forward movement direction, the first sealing surface of the first actuating surface and the first sealing surface of the second actuating surface being complementary to one another, the second sealing surface of the first actuating surface and the second sealing surface of the second actuating surface being complementary to one another, each of the first and second actuating surfaces respectively including a first edge and a second edge, with one of the first and second edges being arranged downstream in the forward movement direction with respect to the other of the first and second edge, the first and second edge being configured to cooperate with one another during the sealing tool changing from the inactive position to the sealing position to cause a transverse cutting of the packaging material, the first and second sealing surfaces of the first actuating surface respectively lying in a first plane and a second plane, and the first and second sealing surfaces of the second actuating surface respectively lying in a third plane and a fourth plane, the first and second planes not being parallel with one another in the forward movement direction, the third and fourth planes not being parallel with one another in the forward movement direction.

20. A sealing apparatus for a packaging machine, the sealing apparatus comprising a sealing tool that is movable between an inactive position and a sealing position, the sealing tool including first and second actuating elements that face one another, each of the first and second actuating elements respectively having first and second actuating surface that face one another, the first and second actuating elements being configured to allow the passage of a packaging material between them in a forward movement direction when the sealing tool is in an inactive position, the first and second actuating elements being configured to transversely seal at least a first portion of the packaging material to a second portion of the packaging material when the sealing tool is in a sealing position, the first and second actuating surfaces being configured to cooperate with one another to perform the transverse sealing, at least one of the first and second actuating elements being moveable with respect to the other when changing between the inactive position and the sealing position, each of the first and second actuating surfaces comprising first and second sealing surfaces, each of the first sealing surfaces being located above the respective second sealing surface, the first and second sealing surface of each of the first and second actuating surfaces being arranged staggered with respect to one another in the forward movement direction, the first sealing surface of the first actuating surface and the first sealing surface of the second actuating surface being complementary to one another, the second sealing surface of the first actuating surface and the second sealing surface of the second actuating surface being complementary to one another, each of the first and second actuating surfaces respectively including a first edge and a second edge, with one of the first and second edges being arranged downstream in the forward movement direction with respect to the other of the first and second edge, the first and second edge being configured to cooperate with one another during the sealing tool changing from the inactive position to the sealing position to cause a transverse cutting of the packaging material, the sealing apparatus further comprising a lower hold-down plate downstream of the sealing tool in the forward movement direction, the lower hold-down plate including a first lower hold-down element and a second lower hold-down element facing each other and between which the packaging material is configured to be arranged, the first lower hold-down element being associated with the first actuating element, and the second lower hold-down element being associated with the second actuating element, such that each of the first and second lower hold-down elements respectively moves integrally with the first and second actuating element to cause a clamping of the packaging material between the first and second lower hold-down elements when the sealing tool is moved towards the sealing position.

\* \* \* \* \*